United States Patent
Grosspietsch et al.

[11] Patent Number: 6,123,181
[45] Date of Patent: Sep. 26, 2000

[54] ARTICULATION HEAD FOR A CLUTCH-RELEASE ROCKER ARM OF A FRICTION CLUTCH

[75] Inventors: Wolfgang Grosspietsch, Schweinfurt; Stefan Rumpel, Euerbach; Ulrich Husse, Schweinfurt, all of Germany

[73] Assignee: Mannesmann Sachs AG, Schweinfurt, Germany

[21] Appl. No.: 09/342,281

[22] Filed: Jun. 29, 1999

[30] Foreign Application Priority Data

Jul. 28, 1998 [DE] Germany ............................ 198 33 855
Sep. 23, 1998 [DE] Germany ............................ 198 43 548

[51] Int. Cl.⁷ .............................. F16D 19/00; F16C 11/00
[52] U.S. Cl. ........................ 192/99 S; 192/98; 403/135; 403/140
[58] Field of Search ..................... 192/99 S, 98; 403/135, 140; 277/212 R

[56] References Cited

U.S. PATENT DOCUMENTS

| | | | |
|---|---|---|---|
| 4,860,870 | 8/1989 | Romig | 192/99 S |
| 5,427,467 | 6/1995 | Sugiura | 403/140 |
| 5,601,378 | 2/1997 | Fukukawa et al. | 403/140 |
| 5,752,780 | 5/1998 | Dorr | 403/135 |

*Primary Examiner*—Charles A Marmor
*Assistant Examiner*—Tisha D. Waddell
*Attorney, Agent, or Firm*—Cohen, Pontani, Lieberman & Pavane

[57] ABSTRACT

An articulation head for a clutch-release rocker arm of a friction clutch of a motor vehicle is sealed with respect to dust and abraded material by means of an elastic sleeve. The sleeve is clamped between flanges of a ball shaft and a bearing shell. Consequently, the articulation head is particularly unsusceptible to wear and can be moved virtually without noise.

5 Claims, 2 Drawing Sheets

ARTICULATION HEAD FOR A CLUTCH-RELEASE ROCKER ARM OF A FRICTION CLUTCH

BACKGROUND OF THE INVENTION

1. Field of the Invention

The present invention relates to a friction clutch of a motor vehicle and more particularly, it relates to an articulation head for a clutch-release rocker arm of a friction clutch of a motor vehicle.

2. Description of the Related Art

A clutch-release rocker arm with an articulation head is known, for example, from EP 0,253,118 A1. One end of the clutch-release rocker arm described in this document is mounted on an actuating bolt, while the other end is mounted on the articulation head. The actuating element has a hydraulic cylinder for axial displacement of the actuating bolt and therefore for displacement of a clutch-release bearing. The clutch release bearing is arranged in a central area of the clutch-release rocker arm of the friction clutch. The clutch-release rocker arm can therefore be pivoted very easily about the articulation head.

A drawback of the known articulation head is that it quickly becomes worn. For example, material abraded from the friction clutch can penetrate between the ball head and the ball socket and damage these components at this location. Moreover, this wear leads to a high level of noise emissions. In the known articulation head, lubrication of the articulation head with grease does not permanently reduce the wear, since the abraded material from the friction clutch can become permanently mixed with the grease and may therefore still cause wear to the articulation head.

It would be conceivable to seal the articulation head using a sealing lip which bears against the ball head. However, this design also fails to limit the wear to the articulation head in the long term, since the sealing lip itself may become worn by the abraded material. Furthermore, the sealing lip results in a considerable limitation to the pivoting angle of the ball head in the ball socket. In addition, since the sealing lip has to bear against that side of the ball head which is remote from the ball socket, it is extremely complex to install.

SUMMARY OF THE INVENTION

The invention is based on the problem of developing an articulation head for a clutch-release rocker arm of a friction clutch of the type mentioned at the outset, such that it can be moved with as little noise as possible and is subject to particularly little wear.

According to an embodiment of the invention, this problem is solved by the fact that the area of the ball head which projects out of the ball socket is sealed by a sleeve which is of resilient design and bears on the bearing shell and on the ball shaft or on a component which adjoins the ball shaft.

This design permanently prevents dust and abraded material from the friction clutch from penetrating between the ball socket and the ball head. Since the sleeve of the articulation head according to the invention is of resilient design, it does not have to slide over the ball head in order to provide a seal and is therefore not damaged by the abraded material from the friction clutch. As a result, the design of the articulation head according to the invention emits particularly little noise and exhibits particularly low levels of wear over the long term. Furthermore, the articulation head according to the invention can very easily be lubricated with a filling of grease without grease being able to penetrate onto clutch linings of the friction clutch. The invention no longer allows abraded material from the friction clutch to contaminate the grease. This further reduces the wear and the generation of noise in the articulation head according to the invention.

According to an advantageous alternative embodiment of the invention, the sleeve can be installed particularly easily if the sleeve has a latching connection to the bearing shell.

According to another advantageous embodiment of the invention, installation of the sleeve is further simplified if the sleeve is of tube-like design and at one end is preloaded against a circumferential flange of the ball shaft. This design enables the sleeve to provide a reliable seal with respect to the ball shaft.

According to another advantageous embodiment of the invention, friction between the sleeve and the ball shaft is maintained at a particularly low level when that area of the sleeve which bears against the flange of the ball shaft has a bent section which runs radially inward. When the ball shaft pivots with respect to the ball socket, the bent section can roll along the flange without slipping. The ball shaft can be pivoted over a particularly wide angle range with respect to the ball socket without there being any risk of dust and abraded material reaching the ball head, provided that end of the sleeve which is remote from the bearing shell has an elastic diaphragm with an opening for the ball shaft. The diaphragm does not hinder assembly if the opening has a cross-shaped design. As a result, the diaphragm can be pushed over the ball head with particular ease.

According to yet another embodiment of the invention, the sleeve can be of particularly inexpensive design if it and the diaphragm are produced as a single component from an elastomeric material. Furthermore, this design makes it easy to fix the spring characteristics of the sleeve.

BRIEF DESCRIPTION OF THE DRAWINGS

In the drawings, wherein like reference numerals denote similar elements throughout the several views.

Figure 1:
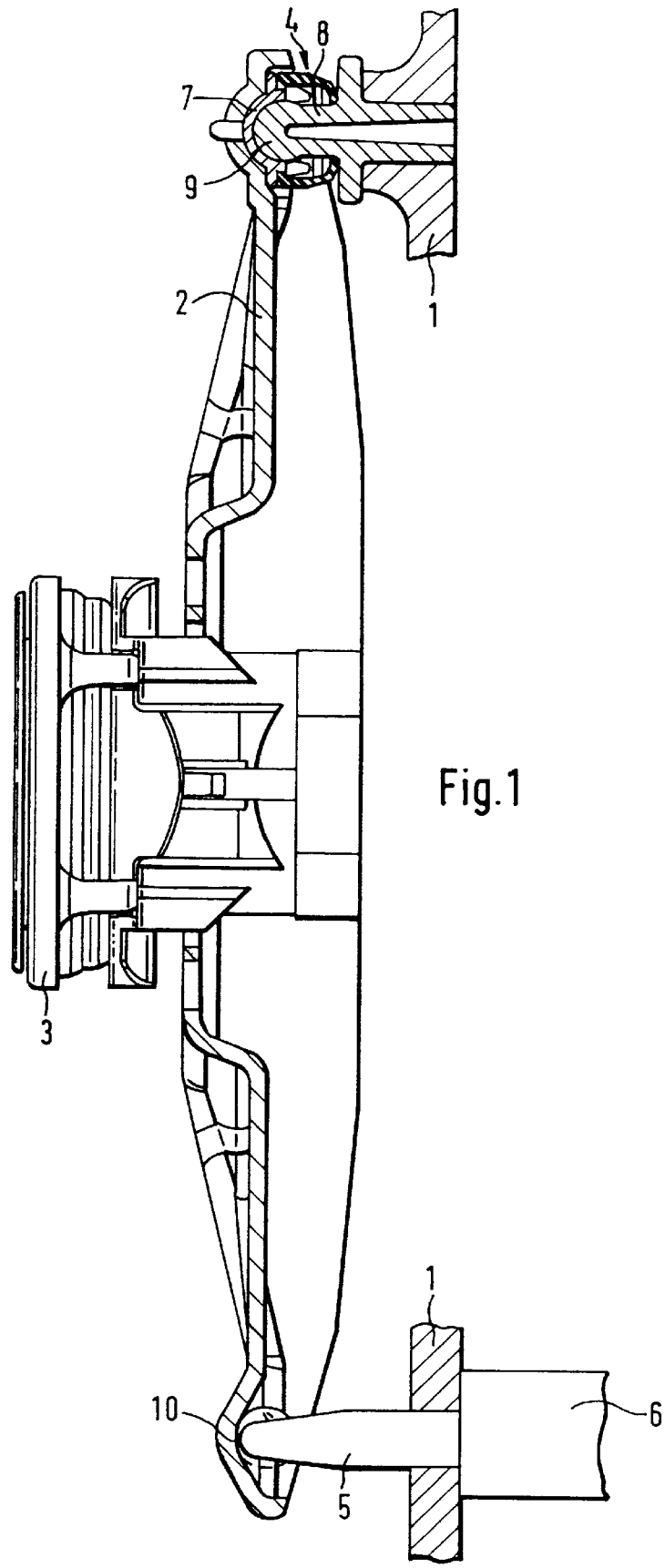
FIG. 1 is a longitudinal section through a clutch-release rocker arm with an articulation head according to an embodiment of the invention.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

FIG. 1 shows a clutch-release rocker arm 2, which can pivot with respect to a stationary clutch housing 1 of a friction clutch of a motor vehicle having a clutch-release bearing 3. One end of the clutch-release rocker arm 2 is supported on an articulation head 4, while the other end is supported on an actuating bolt 5, where it forms a contact point 10. An actuating element 6, which is designed as a hydraulic cylinder and is attached to the clutch housing 1, acts on the actuating bolt 5. The articulation head 4 has a bearing shell 7 and a ball head 9, which is arranged on a ball shaft 8, and is connected to the stationary clutch housing 1 via the ball shaft 8. By extension and retraction of the actuating bolt 5, the actuating element 6 can displace the contact point 10 and thus pivot the clutch-release rocker arm 2 about the center point of the articulation head 4.

Figure 2:
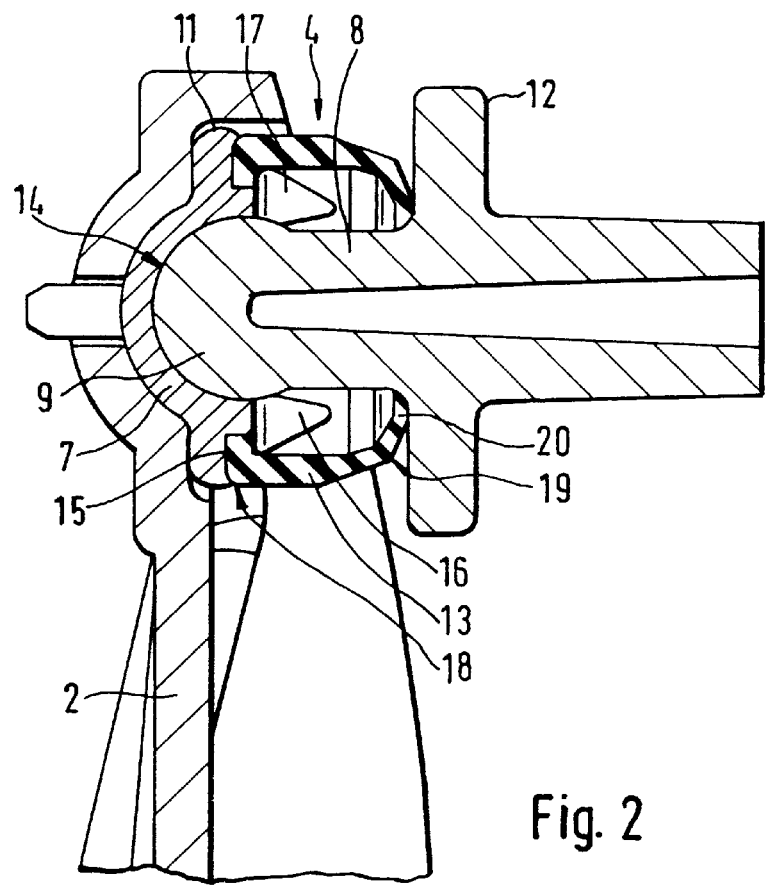
FIG. 2 is an enlarged view of the articulation head shown in FIG. 1.

FIG. 2 shows a considerably enlarged view of the articulation head 4 from FIG. 1. It can be seen from this figure that the bearing shell 7 and the ball shaft 8 each have a flange 11, and 12, respectively. A tubular sleeve 13 is arranged between the bearing shell 7 and the ball shaft 8. The ball head 9 is arranged so that it can slide inside a ball socket 14 of the bearing shell 7. The sleeve 13 is supported on each of the flanges 11, 12 and has a circumferential edge 15 at its end facing toward the bearing shell 7, behind which latching hooks 16, 17 of the bearing shell 7 engage. This provides a latching connection 18 between the sleeve 13 and the bearing shell 7. At its end facing toward the flange 12 of the ball shaft 8, the sleeve 13 has a bent section 19 which runs radially inward. When the ball shaft 8 is pivoted, the sleeve 13 rolls along the flange 12. Furthermore, the sleeve 13 has a diaphragm 20 which surrounds the ball shaft 8.

Figure 3:
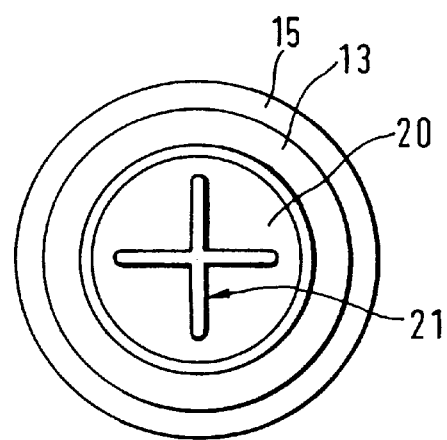
FIG. 3 is a plan view of sleeve of the articulation head shown in FIG. 1 in the uninstalled state.

The sleeve 13 from FIG. 2 is illustrated in its uninstalled position in FIG. 3, which shows a view onto the diaphragm 20. It can be seen from this figure that the diaphragm 20 has an opening 21 for the ball shaft 8 illustrated in FIG. 2. The opening 21 is of cross-shaped design.

The invention is not limited by the embodiments described above which are presented as examples only but can be modified in various ways within the scope of protection defined by the appended patent claims.

We claim:

1. An articulation head for a clutch-release rocker arm of a friction clutch of a motor vehicle comprising:

a bearing shell arranged on the clutch-release rocker and having a ball socket;

a ball shaft having a ball head guided in said ball socket, an area projecting out of said ball socket and a circumferential flange, said ball shaft being provided for connection to an actuating element of the friction clutch; and a resilient sleeve disposed around said ball head for sealing said area projecting out of said ball socket, said sleeve having one end preloaded against said circumferential flange, wherein said sleeve bears on said bearing shell and one of said ball shaft and a component which adjoins said ball shaft, said preloaded end of said sleeve comprising a bent section which bears against said circumferential flange and an elastic diaphragm having an opening for said ball shaft.

2. The articulation head in accordance with claim 1, wherein said sleeve comprises a latching connection for coupling said sleeve with said bearing shell.

3. The articulation head in accordance with claim 1, wherein said sleeve comprises a tubular shape.

4. The articulation head in accordance with claim 1, wherein said opening is cross-shaped.

5. The articulation head in accordance with claim 1, wherein said sleeve and said diaphragm are made of a single piece of elastomeric material.

* * * * *